United States Patent [19]

Lindberg et al.

[11] Patent Number: 4,783,040

[45] Date of Patent: * Nov. 8, 1988

[54] NON-METALLIC STRUT SYSTEM

[75] Inventors: Verne L. Lindberg, Everett; Paul A. Stockinger, Tacoma, both of Wash.

[73] Assignee: Aickin Development Corporation, Seattle, Wash.

[*] Notice: The portion of the term of this patent subsequent to Sep. 22, 2004 has been disclaimed.

[21] Appl. No.: 97,685

[22] Filed: Sep. 17, 1987

Related U.S. Application Data

[63] Continuation-in-part of Ser. No. 912,963, Sep. 26, 1986, Pat. No. 4,695,019, which is a continuation-in-part of Ser. No. 743,102, Jun. 10, 1985, abandoned.

[51] Int. Cl.$^4$ ................................................ F16L 3/03
[52] U.S. Cl. .................................. 248/74.3; 24/274 R; 24/618; 248/62; 403/387; 403/400
[58] Field of Search ............... 248/74.3, 74.4, 74.2, 248/63, 73, 62, 65, 58; 24/274 R, 284, 625, 618; 403/387, 400

[56] References Cited

U.S. PATENT DOCUMENTS

| 4,033,539 | 7/1977 | Bardocz | 403/387 X |
| 4,350,318 | 9/1982 | Gallis | 403/387 X |
| 4,408,928 | 11/1983 | Steinke | 403/387 X |
| 4,695,019 | 9/1987 | Lindberg et al. | 248/74.3 |

Primary Examiner—Ramon O Ramirez
Attorney, Agent, or Firm—Mark Zovko

[57] ABSTRACT

A non-metallic strut support system using a fiberglass channel and composite thermoplastic bands to support piping or ducting used in corrosive environments. The structural strut has a pair of longitudinal flanges which project inwardly. Complimental composite thermoplastic support bands are provided which have a natural curvature for supporting a pipe or duct when the bands are engaged. The bands have flanges on their top portion which engage the flanges of the structural strut when the top portion of the bands are placed within the channel of the strut. The top portion of the bands provides easy insertion and removal of the bands from the strut channel manually, either by inserting and turning to fit in the lock position, or in close clearance areas the head can be compressed to provide snap-in placement into the strut. The bands are adjusted by a bolt in a housing on the end of one band and matching slots on the end of the other band. The bolt and slots are threadably engaged and the bolt is driven until the desired tightness around the pipe or duct is achieved. Stop-locking devices are provided for preventing axial movement of the support bands in the channel. Several alternative strut shapes, which include load bearing top portions and connectors for connecting struts into an integrated system, are disclosed.

10 Claims, 4 Drawing Sheets

NON-METALLIC STRUT SYSTEM

CROSS REFERENCE TO RELATED APPLICATION

This application is a continuation-in-part of our co-pending application Ser. No. 912,963, filed 9-26-86, now U.S. Pat. No. 4,695,019, which is a continuation-in-part of application Ser. No. 743,102 filed 6/10/85, now abandoned.

BACKGROUND OF THE INVENTION

1. Field of the Invention

This invention relates in general to strut framing systems and more particularly to a non-metallic, corrosion resistant framing and mechanical support system for the processes of the corrosive industries.

2. Discussion of the Prior Art

Strut framing systems have been widely used in the U.S.A. as well as internationally for nearly fifty years. However, the advent of high technology manufacturing processes during the last decade has resulted in numerous requirements for more state-of-the-art mechanical support systems. Many attempts have been made by the historical suppliers of strut systems to meet the demands of new industries, but most attempts were based on the basic industry out of which the strut systems have developed. Various grades of stainless steel strut and fasteners have been developed and are available at extremely high costs. Plated and coated steel systems have been developed from galvanizing epoxy to PVC coatings. More recently, several fiberglass strut channels have been introduced, however, their struts are designed for metallic or metallic coated fastener systems.

The strut systems of the present invention are all non-metallic, corrosion resistant framing and mechanical supports for the processes of the corrosive industries. The present invention combines two plastics design and manufacturing methods to produce a mechanical support and attachment system using all non-metallic components.

The structural strut is a specially designed fiberglass pultruded shape incorporating the use of composite structure design with a highly efficient mechanical shape to produce the strongest and stiffest support for the fastener system. The fasteners are designed of high strength composite thermoplastics and are injection molded in two halves. Their shape allows attachment to the strut support without tools, and the position locking connection provides a permanent but adjustable locking support of the process piping or ducting.

Prior to the filing of the present invention, a preliminary patent search of the prior art was performed. The following patents were found and are listed below:

| U.S. Pat. No. | Inventor | Issue Date |
|---|---|---|
| 3,088,702 | Orenick, et al | 5/7/63 |
| 3,527,432 | Lytle | 9/8/70 |
| 3,721,750 | Countryman | 3/20/73 |
| 3,913,187 | Okuda | 10/21/74 |
| 4,061,299 | Kurosaki | 12/6/77 |
| 4,371,137 | Anscher | 2/1/83 |

Perhaps the patent of most interest from this group is U.S. Pat. No. 3,527,432 issued to Lytle. Lytle shows a longitudinal channel with retaining flange for holding clamping plates which are curved to accommodate pipe or tubing. The plates are hooked to the flanges in the channel. The ends adjacent to the curved portions of the clamping plates are formed into parallel flanges with registering holes to accommodate a threaded fastener so that the clamping plates can be tightened onto the pipe. To facilitate insertion of the plates over the pipe and into the channel, one of the clamping plates is provided with two opposite hanging hooks on opposite edges, and the other plate is provided with one hanging hook. The present invention differs in many respects from Lytle. The means of holding the bands of the present invention in the flanges of the channel is different; the means of fastening and holding the pipe or duct is different; also, the bands used in the present invention are much different than Lytle's plates both in structure and result. Further, Lytle does not contemplate use of his support system in a corrosive application.

U.S. Pat. No. 3,721,750 issued to Countryman shows a plastic strapping fastener. It is much different than the present invention in structure and function. The other patents found in the search relate to the general area of fastening systems, but in applicant's opinion, either alone or in combination, do not disclose the key elements of applicant's invention as disclosed herein.

A patent that became a key reference to the parent of this application was by Clark (U.S. Pat. No. 3,226,069 issued 12/28/65). Applicant would like to point out a key and critical distinction between Clarke and their invention. It lies in the top portion of the support bands and more specifically in the contact between the flanges on the hanger and the flanges on the support element. Applicant is aware that merely changing Clark's hangers and support element to thermoplastic and/or fiberglass would not result in patentability. If this were done, Clarke's invention duplicated in plastic and/or fiberglass would fail due to tensile load concentrations at points in his anchors 26 and flanges 22. Clarke's system relies on point and line contact of the anchors 26 and flanges 22, and suggests the use of ear 26b if flanges 24 are rounded, and ear 26a if flanges 24 are straight. (See Clarke, col 3, lines 9-18). In metal, this point and line contact would be acceptable and support the required weight, since metal has sufficient tensile strength to resist the tendency to bend the anchors 26 whether they are shaped as in 26a or 26b, and whether flanges 22 are rounded or straight. Stress concentration would occur in ear shape 26a at the point which the ear 26a meets the medial portion 26c, and in ear shape 26b similarly at the points where the ear 26b changes direction, and at its tip. In either case, flange 24 whether rounded or straight would experience tensile stress due to bending where the flange 24 meets the sides of support 10. Clarke's anchors 26 and flanges 24 are typical of what is conventionally available in the metal hanger art. This system if duplicated in plastic and/or fiberglass would fail when the conventionally required loads were placed upon it. A more comprehensive interface between the support element and hanger is needed, which is supplied by applicants' invention.

SUMMARY OF THE INVENTION

The present invention is a strut support system for piping, tubing or ducting which includes first, a structural support channel having a longitudinal slot. The support channel also has longitudinal flanges along the sides of the slot inwardly projecting toward the centerline of the support channel. The present invention also provides a pair of complemental composite thermoplastic support bands having a bottom portion which forms a natural curvature for cradling a pipe when the ends of the bands are engaged. The bands also have a top portion with two support members having distal flanges capable of engaging the longitudinal flanges of the slot in the support channel when the top portion of the bands is disposed within the longitudinal slot of the support channel. The two support members of the top portion of the support bands are resilient and permit easy manipulaton of the bands for insertion into the slot or for removal from the slot. The bottom portion of the bands has adjustable holding means for connecting and locking the support bands around a pipe. This adjustable holding means preferably includes a screw disposed in a housing connected to the botttom portion of one support band and a series of thread slots on the bottom portion of the other support band. The screw and threads are capable of engagement so that drivig the screw adjusts the diameter of the natural curvature of the bottom portion of the support bands when the slotted end of the one support band is disposed and threadably engaged with the screw in the housing. A hex head is incorporated at either end of the screw, allowing the support bands to be adjusted from either side.

Alternative strut shapes are disclosed which can have various uses depending on the individual shape in an intregated total strut system. For example, the top portion of the strut could be a load bearing member shaped as an I-beam. A channel and slot on the bottom portion could make that I-beam shaped strut usable as a pipe or duct hanger. In all the alternative shapes, the top portion can be thermoplastic, thermoset plastic, or a composite of both. These beam structures are highly stable designs with optimum weight to strength ratios.

To prevent any axial movement of the support bands in the longitudinal slot of the channel, stop-locks are provided. The stop-locks can be fixed to the channel or support element adjacent the support bands to prevent axial slippage of the support bands. Alternatively, a channel fiting member having channels which interlock and fully contact the rounded portion of the support element can be used where the longitudinal flanges meet the sides of the support element. In yet another embodiment, the channel fitting member makes interlocking contact with the rounded edges of the support element. Another means to secure the support bands in the slot of the support element is to provide a locking spring portion on the top portion of the support bands for retaining the support bands in the channel.

Several alternatives for connecting two or more support elements are provided. The purpose of these connectors is to allow the formation of an integrated strut framing system or a strut system tailored to a specific need by connecting several individual support elements together. In one embodiment, the connector includes an internal member which engages the longitudinal flanges and sides of the support element after being placed within the support element. Fastening means fasten each support element to the internal member. In another embodiment, the connector includes external connecting means which engage the exterior sides and top of the support element. The fastening means includes a nut in the longitudinal slot which interlockingly engages the sides of the support element and the rounded portions of the longitudinal flanges. In a third embodiment, the connector includes a channel fitting having at least two channels therein which are adapted to engage the rounded portion of the support element where the longitudinal flanges meet the sides of the support element. A fastener holds the channel fitting to each support element to be connected.

It is an object of the present invention, therefore, to provide a non-metallic, corrosion resistant framing and mechanical support system for pipes or ducts.

It is another object of the present invention to provide a highly efficient fastening system which allows attachment to the strut support without the use of tools.

It is a further object of the present invention to provide a strut support system for use in corrosive application which is relatively inexpensive.

Another object of the present invention is to provide struts which have varied top portions useful in individual applications while retaining similar bottom portions for hanging pipe or duct.

Yet another object of the present invention is to provide stop locking devices which prevent movement of the support bands within the slot of the support element.

A still further object of the present invention is to provide alternative connecting systems for individual struts or support elements to allow the formation of an integrated strut framing system.

These and other objects and advantages of the present invention will become more apparent from the following detailed description when taken in conjunction with the attached drawings.

DETAILED DESCRIPTION OF THE PREFERRED EMBODIMENT

Figure 1:
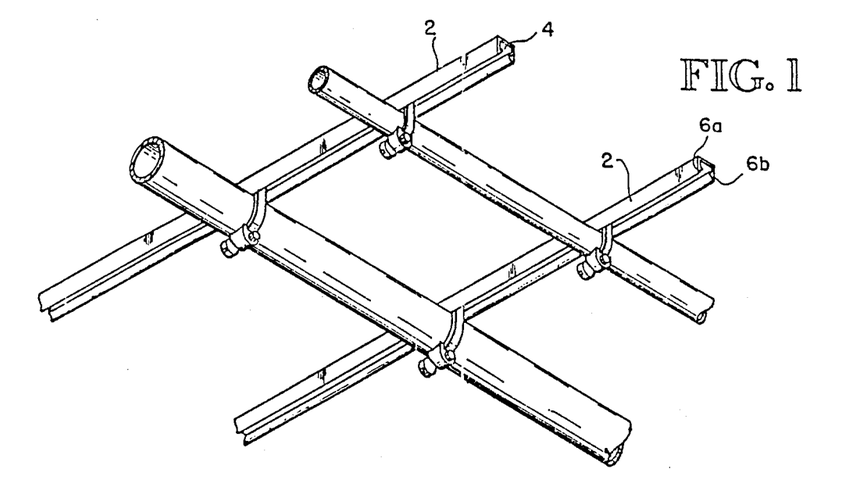
FIG. 1 is assembly application in accorance with the present invention.
Figures 2, 3:
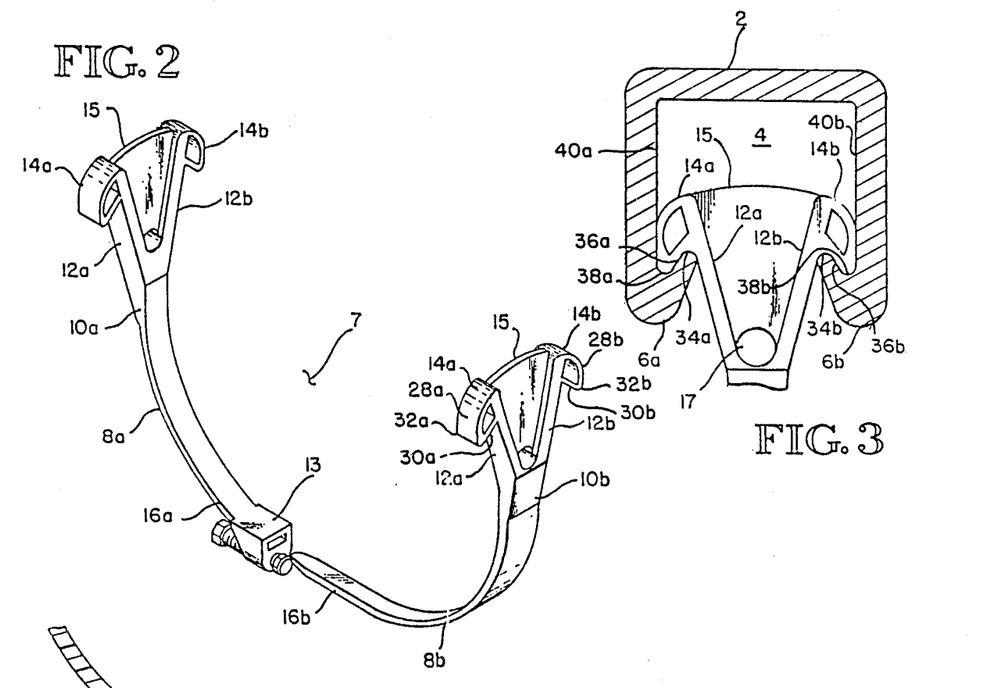
FIG. 2 is an elevation view of a support band of the present invention.
FIG. 3 is a sectional view of the support band and longitudinal channel partially in cross section in accordance with the present invention.

Referring to FIG. 1, a pair of fiberglass channels 2 are shown. Channels 2 have longitudinal slots generally referred to as 4 and a pair of longitudinal flanges 6a and 6b. Flanges 6a and 6b project inwardly toward the center line of channel 2. Channel 2 is considered to be a structural support element for the entire strut system. Referring to FIG. 2, composite thermoplastic pipe supporting band generally designated as 7 is shown. Pipe supporting band 7 is comprised of a pair of supporting bands 8a and 8b used in the strut support system of the present invention. The complemental nature of this pair of support bands will be described subsequently.

Figure 4:
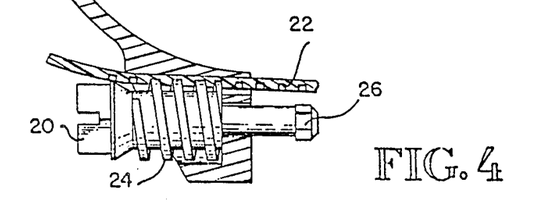
FIG. 4 is an elevation view in cross section of the support band showing the adjusting means.

Each of the pair of support bands 8a and 8b has a top portion, designated as 10a and 10b with two support members 12a and 12b. The support members 12a and 12b of support bands 8a and 8b have a pair of distal flanges 14a and 14b extending therefrom. The flanges 14a and 14b are used to engage the flanges 6a and 6b of the channel 2 when the strut system is in operation as shown best in FIG. 3. The top portions of each support band 8a and 8b has a web 15 with a hole 17. The support bands 8a and 8b also have bottom portions generally designated as 16a and 16b. The bottom portion 16a and 16b of the support bands 8a and 8b have a natural complemental curvature to allow cradling of a pipe (not shown) when the ends of support band 8 are engaged. The bottom portion 16a of the support band 8a has a housing 13 with a screw 20 disposed therein. The bottom portion 16b of the other support band 8b has a series of thread slots designated as 22 (see FIG. 4) capable of threadable engagement with the threads 24 of screw 20. The housing 13 is adapted to receive the slots 22 of support band 8b when locking and tightening of the support system is desired during operation. A hex 26 is molded on the end of screw 20 to allow adjustment of the support bands from the end opposite the head of screw 20.

In operation, the longitudinal channel 2 is appropriately hung in place, being supported to a ceiling (not shown) or the like by suitable conventional means. Each of the support bands 8a and 8b are manipulated by hand so that flanges 14a and 14b of top portion 10 of the support bands 8a and 8b are made to engage with flanges 6a and 6b of channel 2. A pipe to be supported is placed between the pair of bands 8a and 8b so that the curvature of the band 8a containing the bolt 20 and housing 18 is directed toward the curvature of band 8b containing the slots 22. The bottom portion of the band 8b is then pushed through the housing 18 contained on the other band 8a until the slots 2 engage threads 24. The pair of bands 8a and 8b can now be finally adjusted by driving the screw 20 with a screwdriver (not shown) or the like until the desired tightness around the pipe is achieved. Alternatively, hex 26 can be driven to achieve the desired adjustment. The hex 26 gives the support system added flexibility with respect to access of an operator in adjusting the system. The strut system can be used with any size pipe or ducting by increasing or decreasing the size of the channel 2 and the support bands 8a and 8b.

Referring to FIG. 2 and 3, the engagement of flanges 14a and 14b, and the channel 2, as shown in that Figure can be described. From FIG. 2 it should be noted initially that flanges 14a and 14b have side portion 28a and 28b, undersides 30a and 30b, and rounded bottom edges 32a and 32b. From FIG. 3, longitudinal flanges 6a and 6b have rounded edges 34a and 34b. The interior surfaces 36a and 36b of flanges 6a and 6b have rounded portions 38a and 38b where the flanges 6a and 6b meet the sides 40a and 40b of channel 2. When flanges 14a and 14b engage 6a and 6b, substantially, full and interlocking contact occurs (as shown in FIG. 3) between the die portion 28a and 28b of the distal flanges 14a and 14b, and the sides 40a and 40b of the channel 2. This contact or engagement also includes the undersides 30a and 30b of flanges 14a and 14b, including rounded edges 32a and 32b and the interior surfaces 36a and 36b of flanges 6a and 6b including rounded portions 38a and 38b, and rounded edges 34a and 34b. The radii of rounded edges 32a, 32b and 34a, 34b, will depend on the size of pipe to be supported.

As an alternative to web 15, a cross element (not shown) could be used. This element would extend between the distal flanges 14a and 14b. In operation in very tight spaces, web 15 or the cross element can be severed allowing easier manipulation of the flanges 14a and 14b into engagement with flanges 6a and 6b.

ALTERNATIVE AND ADDITIONAL EMBODIMENTS

Figure 5A:
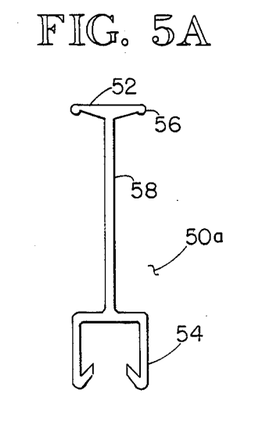
FIGS. 5A through 5J show various shapes of the top portion of the strut in cross section.
Figure 5B:
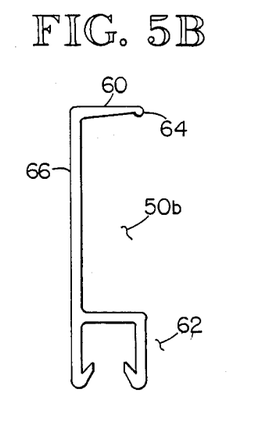
Figure 5C:
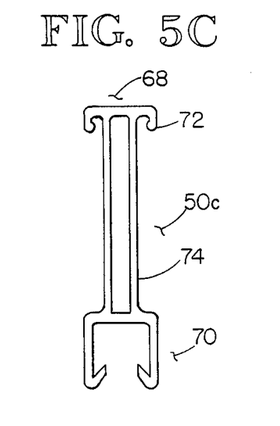
Figure 5D:
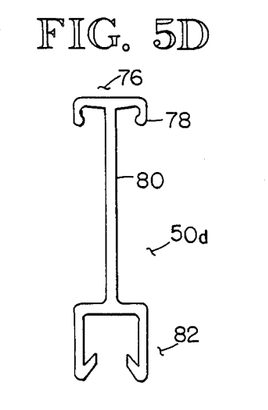
Figure 5E:
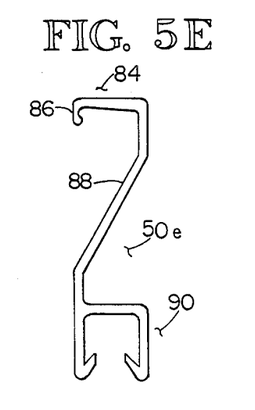
Figure 5F:
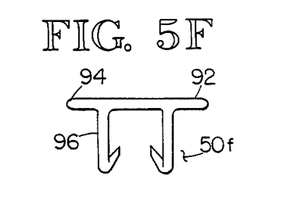
Figure 5G:
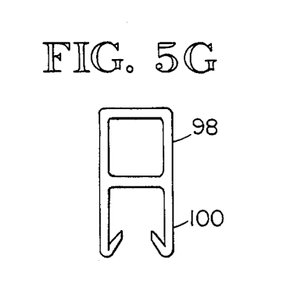
Figure 5H:
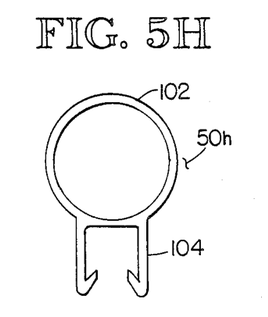
Figure 5I:
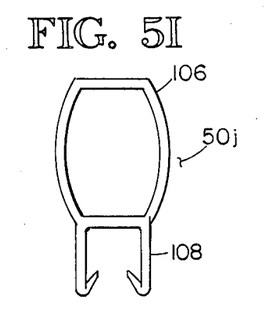
Figure 5J:
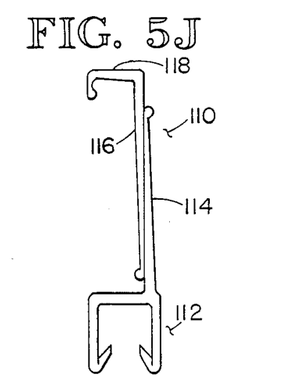

Referring to FIGS. 5A and 5J, various embodiments of a strut generally designated as 50a through j corresponding with the appropriate Figure letter are shown. Strut 50a, in FIG. 50A for example, can be made of thermoset plastic, thermoplastic or a composite of both as can all the other struts shown in each Figure. Strut 50a has a top portion 52 and a bottom portion 54 which corresponds to the fiberglass structural support element generally designated as 2 in FIGS. 1 and 3. The individual structures of the top portions of each strut depicted in FIGS. 5A through 5J have a highly stable design with optimum weight to strength ratio and provide a load bearing capacity for the struts. The top portion 52 of strut 50a is shaped as an I-beam in cross section with an upper flange 56 and web 58. FIG. 5B shows a strut 50b having a top portion 60 and a bottom portion 62. In all of the embodiments, 50a through 50j, the bottom portion of the strut is identical to the fiberglass support element 2 of FIGS. 1 and 3. The top portion 60 of strut 50b has an upper flange 64 at one end connected to a web 66 which in turn is connected to one side of the bottom portion 62 of strut 50b. FIG. 5C shows a strut 50c having an upper portion 68 and lower portion 70. The upper portion 68 has a T-shaped beam with an upper flange 72 and a web 74 which is hollow. FIG. 5D shows a strut 50d having an upper portion 76 with a T-shaped cross section found by flange 78 and web 80. The web 80 unlike web 74 of strut 50c is not hollow. The bottom portion 82 is connected to web 80. FIG. 5E shows a strut 50e with a Z-shaped top portion 84 formed by an upper flange 86 and a web 88 formed as shown in FIG. 5E. Web 88 connects to one side of the bottom portion 90 of strut 50e. FIG. 5F shows a strut 50f having side flanges 92 and 94 protruding from the top of support element 96. FIG. 5G shows a strut 50g having a square shaped upper portion 98 and a bottom portion 100. The upper portion 98 is hollow. FIG. 5H shows a strut 50h with a circular upper portion 102 and a bottom portion 104. Circular upper portion 102 is hollow. FIG. 5I shows a strut 50i having an upper portion 106 and bottom portion 108. Upper portion 106 is generally of rectangular shape with curvilinear sides, and is hollow. FIG. 5J shows a strut 50j having an upper portion 110 and lower portion 112. Upper portion 110 is made up of two segments. One segment consists of web 114 connected to one side of bottom portion 112. Web 114 is joined to web 116 which has an upper flange 118 connected thereto. The web 116 and web 114 may be suitably joined by glue or the like. Each of the above described shapes can have individual and varied uses in an integrated strut supporting system.

Figure 6:
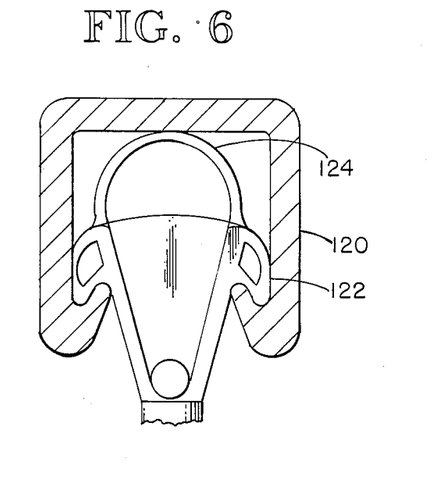
FIG. 6 is a cross sectional view of the support band with locking spring and longitudinal channel in accordance with the present invention.
Figure 7A:
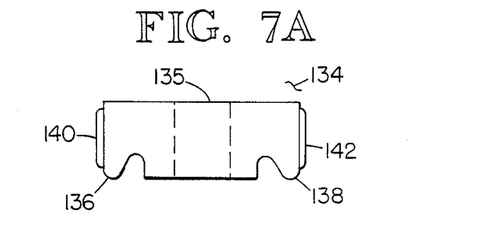
FIG. 7A is a front view of a channel nut used in the present invention.
Figure 7B:
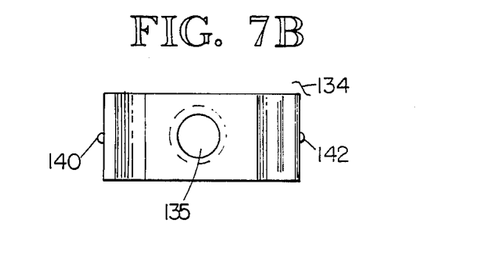
FIG. 7B is an elevation view of a channel not shown in FIG. 7A.
Figure 8:
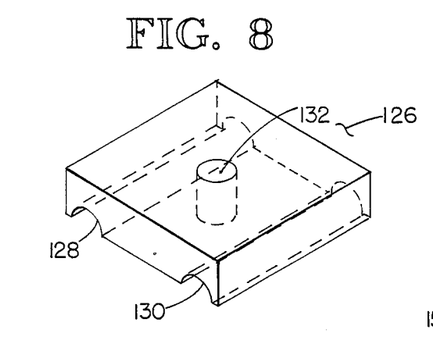
FIG. 8 is a pictorial view of a stop lock in accordance with the present invention.

Referring to FIG. 6, a locking spring in combination with a fiberglass support element and thermoplastic band is shown. In this Figure a support element 120 with the top portion of a support band 122 therein, substantially as shown in FIG. 3, has a locking spring 124 attached to the top portion of the support band 122. The locking spring 124 is of thermoplastic material and integral with the top portion of the support band 122. The locking spring 124 provides a clamping force which prevents axial slippage of the top portion of the support band 122 within support element 120. Alternative means of preventing a support band from axially sliding during use in the support element is shown in FIGS. 7A, 7B, and 8. A stop lock 126 (FIG. 8) is shown having channels 128 and 130 which are used to engage the rounded edges 34a and 34b of the support element 2 (see FIG. 3). In operation, a hole 132 through stop lock 126 is provided and stop lock 126 is fixed to the support element by a bolt (not shown) through hole 132 which engages a nut such as nut 134 of FIGS. 7a and 7b. Nut 134 is made of a composite thermoplastic and has flanges 136 and 138 which enable full and interlocking contact with the flanges 6a and 6b of support element 2 (see FIG. 3) in a manner identical to the interlocking contact of the flanges 14a and 14b of the support bands and flanges 6a and 6b of the support element as shown in FIG. 3. Nut 134 also has protrusions 140 and 142 which function as resilient position locks that hold nut 134 in place when it is disposed in the longitudinal slot 4 (FIG. 3). In operation, the stop lock 126 is placed so that its channels 128 and 130 interlock the rounded edges 34a and 34b (FIG. 2) of channel 2. Nut 134 is disposed in slot 4 of channel 2 so that interlocking occurs between flanges 136 and 138 of nut 134 and flanges 6a and 6b of channel 2. A bolt (not shown) can then connect stop lock 126 through hole 132 and nut 134 through hole 135, thereby fixedly attaching the stop lock 126 to channel 2.

Figure 9:
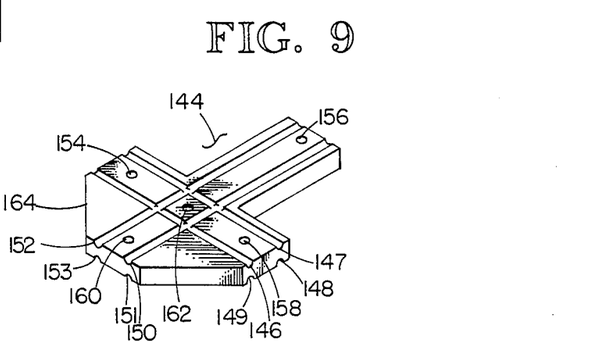
FIG. 9 is a partial view of a universal channel fitting provided for the strut system.

Referring to FIGS. 9a and 9b, a universal channel fitting can be described. Channel fitting 144 is shown having channels 146, 147, 148, 149, 150, 151, 152 and 153 best shown in FIG. 9b. These channels are used to engage the rounded edges 34a and 34b (FIG. 3) of the support element 2. Splicing or joining of two support elements can occur by interlocking appropriate channels of channel fitting 144 with the rounded edges 32a and 32b of a support element. Channel fitting 144 can then be fixed by bolts (not shown) through the appropriate holes 154, 156, 158, 160 or 162 engaging nuts (not shown) to each support element to be joined. The shape of channel fitting 144 allows a wide range of possible joints. Channel fitting 144 also has a webbed section 164 which can be cut out or removed if desired to extend its flexibility.

Figure 10A:
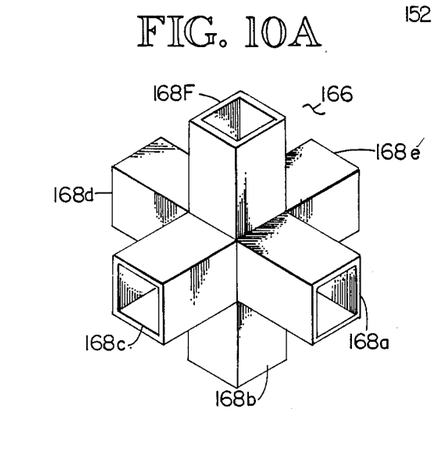
FIG. 10A is a pictorial view of an internal connector.
Figure 10B:
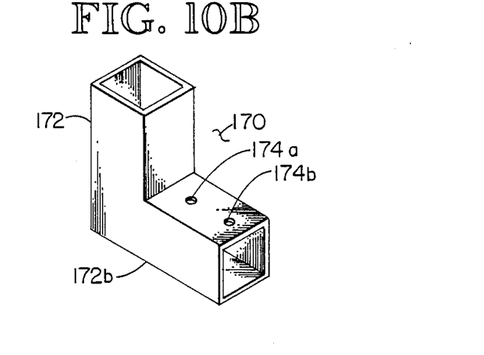
FIG. 10B is a pictorial view of an alternative internal connector.
Figure 11A:
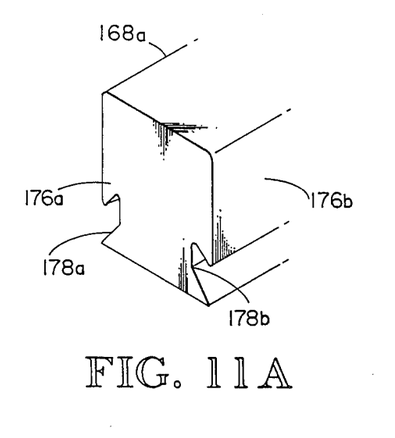
FIG. 11A is a cross sectional view along lines 11—11 of FIGS. 10A showing one cross sectional configuration.
Figure 11B:
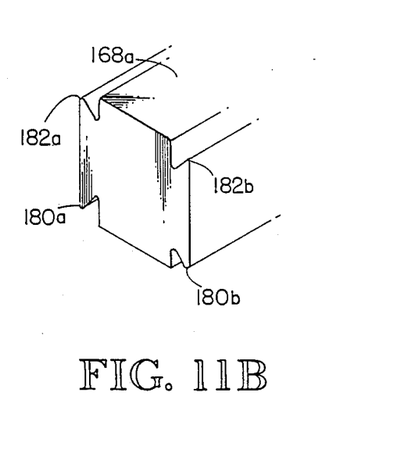
FIG. 11B is a cross sectional view along line 11—11 of FIG. 10A showing an alternative cross sectional configuration.

Referring to FIG. 10a, a 6-way internal connector 166 for the support elements can be described. The 6-way connector 166 has a series of arms 168a,b,c,d,e,f disposed at right angles to each other. The arms 168a through 168f are made to engage the slot 4 of six support elements 2, thereby connecting all six internally through connector 166. FIG. 10b shows another internal connector 170 having two arms 172a and 172b for connecting two support elements at an angle. Arm 172a would be disposed in slot 4 of a support element 2. Arm 172b would then be fitted into another support element 2 and fastened thereto by means of bolts (not shown) and nuts such as nut 134 (FIG. 6) through holes 174a and 174b. FIG. 11a shows a cross-section through an arm 168a of internal connector 166. The arm has flanges 176a and 176b and recesses 178a and 178b which interlockingly engage the flanges 6a and 6b of support element 2 (FIGS. 1 and 3). FIG. 11b shows an alternative cross-section for arm 168a which has flanges 180a and 180b which interlock with flanges 6a and 6b of support element 2. Another similar set of flanges 182a and 182b is located on the top of the connector arm 168a, allowing the union of two support elements arranged with the slots 4 facing each other.

Figure 12:
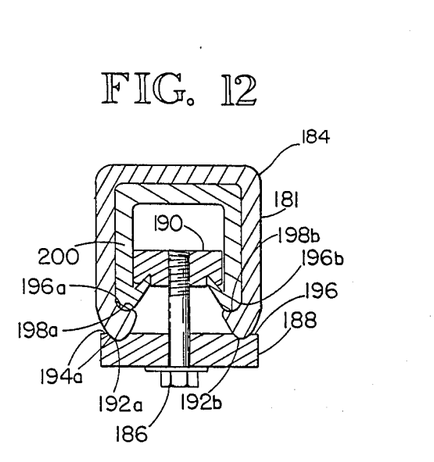
FIG. 12 is a cross sectional view of a support element of the present invention and an external connector including fastening means.

FIG. 12 shows an external connector 184 for connecting or splicing two support elements. A support element 200 having longitudinal flanges 189a and 198b is disposed within external connector 184. The support element 200 is fastened to external connector 184 by a bolt 186 through channel fitting 188 and threaded into nut 190. Nut 190 is identical to the nut described previously and shown in FIGS. 7a and 7b. The channel fitting 188 has channels 192a and 192b which engage the rounded edge 194a and 194b of connector 184. In turn, the external connector 184 has rounded portion 196a and 196b which engage the rounded edges flanges 198a and 198b of support element 200. In operation, two support elements 200 would be placed adjacent to each other and each disposed in the external connector 184. The channel fitting 188 would bridge the gap between the adjacent support elements 200 and each would be fastened to the external support element 184 as shown with a bolt 186 and nut 188.

Figure 13:
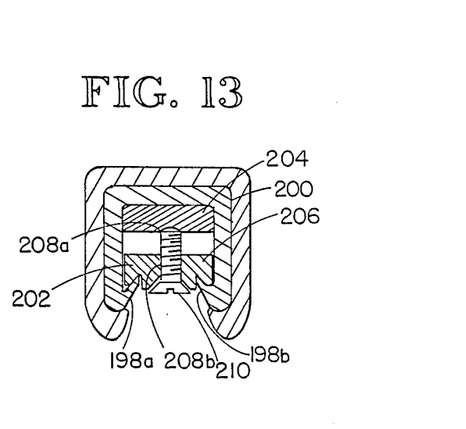
FIG. 13 is a cross sectional view of a support element of the present invention showing an internal stop lock.

FIG. 13 shows an alternative stop means for preventing axial movement of the flanges 14a and 14b (FIG. 2) of the support bands 8a and 8b (FIG. 2). The internal stop designated as 202 fits within support element 200 and has an upper portion 204 which contacts the inner top of the support element 200 and a lower portion 206 which interlockingly engages the flanges 198a and 198b of support element 200. Thread holes 208a and 208b are provided through the upper portion 204 and lower portion 206 of stop 202, respectively. A screw 210 can be used to fasten stop 202 internally to support element 200. Placed adjacent to support bands 8a and 8b (FIG. 2), lateral movement of these bands can be prevented during load bearing operation.

What we claim is:

1. In combination:
   a. a structural beam member;
   b. a fiberglass structural support element integral with said beam member, said fiberglass structural support element having sides forming a longitudinal slot;
   c. longitudinal flanges inwardly projecting toward the center line of said support element along the sides of said support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;

d. a pair of complementary composite thermoplastic pipe support band having bottom portions forming a natural curvature for cradling a pipe when the end of said bands are engaged, said supporting bands having a top portion, said top portion having distal flanges, said distal flanges having side portions, undersides, rounded bottom edges of a pre-determined radius, and otherwise so shaped as to allow substantially full and interlocking contact between the side portions of said distal flanges and the sides of said support element and between the undersides of said distal flanges, including their rounded edges and the interior surface of said longitudinal flanges including the rounded portions of said longitudinal flanges where said longitudinal flanges meet the sides of said support element, and the rounded edges of said longitudinal flanges when the top portion of said support bands is disposed within said longitudinal slot;

e. adjustable holding means on the bottom portion of said supporting bands for connecting and locking said support bands around a pipe.

2. In combination:

a. a fiberglass structural support element having sides forming a longitudinal slot;

b. longitudinal flanges inwardly projecting toward the center line of said support element along the sides of said support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;

c. a pair of complemental composite thermoplastic pipe supporting band having a bottom portions forming a natural curvature for cradling a pipe when the end of said bands are engaged, said supporting band having a top portion, said top portion having clamping means attached thereto, said clamping means contacting the top inner surface of said support element when the top portion of the supporting bands is engaged within the longitudinal slot, said top portion having distal flanges, said distal flanges having side portions, undersides, rounded bottom edges of a pre-determined radius, and otherwise so shaped as to allow substantially full and interlocking contact between the side portions of said distal flanges and the sides of said support element and between the undersides of said distal flanges, including their rounded edges and the interior surface of said longitudinal flanges including the rounded portions of said longitudinal flanges where said longitudinal flanges meet the sides of said support element, and the rounded edges of said longitudinal flanges when the top portion of said support band is disposed within said longitudinal slot; and d. adjustable holding means on the bottom portion of said supporting bands for connecting and locking said support bands around a pipe.

3. In combination:

a. a fiberglass structural support element having sides forming a longitudinal slot;

b. longitudinal flanges inwardly projecting toward the center line of said support element along the sides of said support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;

c. a pair complemental composite thermoplastic pipe supporting bands having a bottom portions forming a natural curvature for cradling a pipe when the end of said bands are engaged, said supporting bands having a top portion, said top portion having distal flanges, said distal flanges having side portions, undersides, rounded bottom edges of a pre-determined radius, and otherwise so shaped as to allow substantially full and interlocking contact between the side portions of said distal flanges and the sides of said support element and between the undersides of said distal flanges, including their rounded edges and the interior surface of said longitudinal flanges including the rounded portions of said longitudinal flanges where said longitudinal flanges meet the sides of said support element, and the rounded edges of said longitudinal flanges when the top portion of said support bands is disposed within said longitudinal slot; and d. adjustable holding means on the bottom portion of said supporting bands for connecting and locking said support bands around a pipe.

e. stopping means fixedly attached to said support element, said stopping means adjacent to the top portion of said supporting bands for preventing said support bands from longitudinal movement within said longitudinal slot.

4. The apparatus of claim 3 when said stopping means includes a channel fitting member having channels which contact the rounded portions of said support element where the longitudinal flanges meet the sides of said support element.

5. The apparatus of claim 4 wherein said stopping means makes interlocking contact with the rounded edges of the support element.

6. In combination:

a. at least two fiberglass structural support elements each having sides forming a longitudinal slot;

b. longitudinal flanges inwardly projecting toward the center line of each support element along the sides of each support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;

c. connecting means for connecting two of said support elements which include an internal member engaging the longitudinal flanges and sides of each support element, said internal member disposed within the longitudinal slot of each support element, and d. fastening means for fastening each support element to said internal member.

7. In combination:

a. at least two fiberglass structural support elements each having sides forming a longitudinal slot;

b. longitudinal flanges inwardly projecting toward the center line of each support element along the sides of each support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;

connecting means for connecting two support elements which includes an external connector, said external connector engaging the exterior sides and top of each support element to be connected, and d. fastening means for fastening the external connector to each support element.

8. The apparatus of claim 7 wherein said fastening means includes a nut disposed in the longitudinal slot of each support element, said nut interlockingly engaging the sides of the support element and the rounded portions of the longitudinal flanges of each support element.

9. In combination:
a. at least two fiberglass structural support elements each having sides forming a longitudinal slot;
b. longitudinal flanges inwardly projecting toward the center line of each support element along the sides of each support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;
c. connecting means for connecting two support elements which includes a channel fitting member having at least two channels therein, said channels adapted to engage the rounded portions of each of said support elements where said longitudinal flanges meet the sides of said support element, and
d. fastening means for fastening said channel fitting member to each of said support elements.

10. In combination:
a. a fiberglass structural support element having sides forming a longitudinal slot;
b. longitudinal flanges inwardly projecting toward the center line of said support element along the sides of said support element, each of said longitudinal flanges having an interior surface adjacent said slot, said interior surface of said longitudinal flanges having a rounded portion where said longitudinal flanges meet the sides of said support element, said longitudinal flanges having rounded edges of a predetermined radius;
c. a pair of complemental composite thermoplastic pipe supporting bands having a bottom portions forming a natural curvature for cradling a pipe when the end of said bands are engaged, said supporting bands having a top portion, said top portion having distal flanges, said distal flanges having side portions, undersides, rounded bottom edges of a pre-determined radius, and otherwise so shaped as to allow substantially full and interlocking contact between the side portions of said distal flanges and the sides of said support element and between the undersides of said distal flanges, including their rounded edges and the interior surface of said longitudinal flanges including the rounded portions of said longitudinal flanges where said longitudinal flanges meet the sides of said support element, and the rounded edges of said longitudinal flanges when the top portion of said support bands in disposed within said longitudinal slot;
d. adjustable holding means on the bottom portion of said supporting bands for connecting and locking said support bands around a pipe.

* * * * *